Dec. 3, 1968   D. W. BIDDLE   3,413,751

FREE ROLLING SINKER AND LEADER CONNECTING LINK

Filed Oct. 10, 1966

Delbert Westover Biddle
*INVENTOR.*

United States Patent Office 3,413,751
Patented Dec. 3, 1968

3,413,751
FREE ROLLING SINKER AND LEADER
CONNECTING LINK
Delbert Westover Biddle, 3384 Dartmouth Drive,
Santa Rosa, Calif. 95405
Filed Oct. 10, 1966, Ser. No. 585,474
6 Claims. (Cl. 43—44.97)

ABSTRACT OF THE DISCLOSURE

An elongated flexible rod of restricted cross-section has axially aligned weighted rollable sinker heads mounted on the respective ends of the rod at spaced apart points. A novel line attaching link has an eye at its leading end with which a leader can be connected. The trailing end of the link has an elongated loop which is slidingly and pivotally shiftable on the rod between the heads in a plurality of planes including the axis of the rod. This unique "trip free" principle allows the angler to free an entangled line without losing any of his tackle.

The present invention relates to fishing tackle and, more specifically stated, to a novel sinker and improved means whereby an end of a fishing line leader can be linked and operatively joined with a coacting component part of the sinker in a manner to provide a unique linking connection between the leader and sinker.

Briefly, the concept has to do with a novel sinker which is such in construction that it is capable of rollable contact with the water's bottom, and the combination therewith of a leader connecting link which has desirable trip free connection with the sinker and is such in construction that it serves to accommodate a conventional type swivel which is operatively connected to a cooperating end of the link and said swivel being such that the end of a leader can be tied or otherwise connected thereto.

As will be hereinafter more fully evident the sinker and link combination is susceptible of practical and feasible use on a rock laden water bed whether the water is deep or shallow or swift or calm, as the case may be. The sinker is characterized by rollable components which can roll along sandy bottoms or bottoms choked with debris. Should it snag or tend to hang up on a firm rooted rock or the like on said bottom the angler can resort to several ways of freeing his tackle. To begin with, he can allow a slack in the line so as to let the water movement free the sinker which in turn usually results in freeing the line. A second mode of handling would be, after the line has been allowed to slacken, to give it a quick jerk which in most instances will free the otherwise entangled line. In any event, the orientation and coordination of the specially constructed sinker and the leader connecting link is an innovation in that it assures the desired trip free action which is not attainable even in a roller type sinker as shown for example in Mortensen's trolling lead 2,502,875 or the broadly analogous but rather dissimilar fishing sinker in a patent to Michael 3,057,110.

The present invention is also deemed to be a worthy contribution to the art in that the construction is such that the component parts can be easily and economically mass produced resorting to the use of lead and steel in one adaptation or, alternatively, to metal and plastic material or a combination of plastic materials. A preferred embodiment is that herein disclosed and which is characterized by the aforementioned sinker. To the ends desired the sinker comprises a pair of rollable heads which can be cylindrical rollers or ball-shaped, the inner ends of said heads being joined by an elongated flexible rod or an equivalent connecting member and the adjacent ends of the heads being spaced apart to accommodate an elongated loop member on a twisted wire or an equivalent connecting link, preferably a type of a link which serves to permit the attachment thereto of a leader connecting swivel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
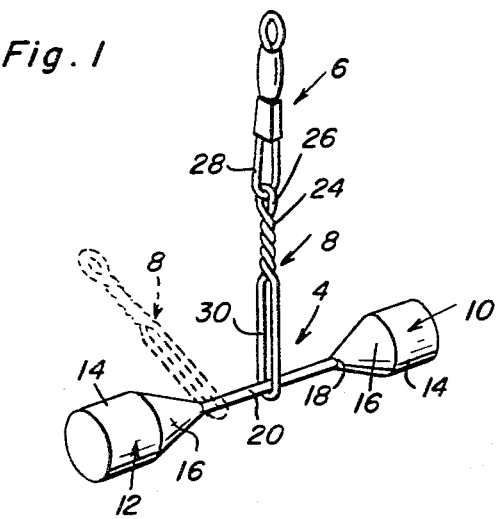
FIG. 1 is a view in perspective showing three component parts; namely, the improved twin-head roller type sinker, a conventional leader attaching swivel, and a link providing an operating connection between the sinker and the swivel.

Referring now to the views of the drawing, it will be seen that the sinker is denoted, generally speaking, by the numeral 4. The swivel, which may be of any type and may be regarded as individually old in the art, is denoted at 6. The operating connection or means affording a connection between the sinker 4 and swivel 6 is denoted at 8 and is characterized by the aforementioned novelly constructed link.

Figure 2:
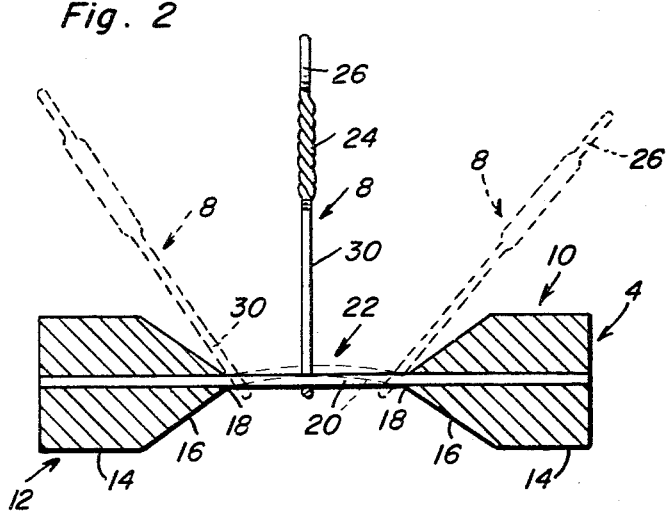
FIG. 2 is a view on an enlarged scale with the heads appearing in section and which omits the swivel and serves to illustrate the freedom of movement which is attainable between the looped end of the link and the rod component of the sinker.

The sinker 4 comprises a pair of duplicate axially aligned terminal heads the one at the right denoted by the numeral 10 and the one at the left by the numeral 12. In the embodiment shown, the body portion of each head is cylindrical in cross-section as denoted at 14 thus providing a bed or bottom contacting roller. The inner adjacent ends are of tapered or conical form as denoted at 16 and the apical end portions 18 are aligned with each other and are joined together in spaced apart relation by a flexible head uniting rod. The end portions of the rod are shown embedded in the heads as illustrated in FIG. 2 but some other equivalent mechanical construction could be resorted to. It is important however that the median portion 20 of the over-all rod 22 be exposed or alternatively, such in length that the conical portions 16 are spaced apart to allow for free play of the line connecting link 8. This link is preferably formed from stainless steel which has its forward or leading end twisted as at 24 and terminating in an eye 26 with which the coacting member 28 of the swivel 6 is hingedly or pivotally connected. The trailing end portion of the link is fashioned into an elongated loop 30 which is of the proportions shown in the views of the drawing and which provides a free sliding connection between the rod 20 and the link in the manner shown.

The rod providing the connection between the lead or equivalent sinker heads 10 and 12 may be of flexible material to enhance the trip free action which is the essence of the over-all inventive concept. It is to be pointed out here that the weights at the end portions of the bar or rod need not, of course, be cylindrical or of the shape shown inasmuch as it is within the purview of the invention to use weights or heads of ball-like or equivalent spherical form. It is reiterated that the underlying principle involved has to do with the trip free action achieved by the loop 30 riding back and forth on the rod and in-between the weighted terminal heads and which is pivotally swingable on said rod in several planes which include the axis of said rod.

As is deemed to be apparent from the disclosure the sinker utilizes a swivel type connector to couple it with the fishline or the leader which in turn is connected with the fishline and because of the construction shown the roller type sinker constitutes an artificial bait which functions to attract most game fish. The invention is novel in that it features an adaptation which in water or when trolling at the bottom of the body of water, pole or rod movement and the water current activates the motion due to the unusual design of the sinker itself. Experience has shown that depth of water is of no significant importance in proper operation of the invention. The trip free action and ease with which this particular sinker can be freed when snagged prevents loss of tackle which can be a significant factor when fishing in rocky waters and also where seaweed and similar objects (debris generally) are encountered.

What is claimed as new is as follows:

1. In combination, a sinker unit characterized by an elongated rod of restricted cross-section, said rod being provided at opposite ends with weighted heads constituting individual but conjointly usable sinkers, and a link adapted to provide a linking connection between said rod and a leader on a fishing line, said link comprising an elongated loop which is freely and slidably connected with said rod between said weighted heads and which is provided at a leading end with an eye to which a leader connecting swivel may be connected, said elongated loop being pivotally swingable on said rod in several planes which include the axis of said rod.

2. The structure defined in claim 1 and wherein each head is made of lead and has a body portion constituting a roller, the inner end portions of said heads being of tapered conical form and having their apical portions in alignment with each other, the end portions of said rod being joined to the respective apical portions.

3. The combination defined in and according to claim 1 and wherein said rod is normally straight but is made of flexible material and is accordingly capable of being flexed.

4. The combination according to claim 1 and wherein said rod is normally straight, said weighted heads being mounted on the respective outer end portions of said rod.

5. The combination according to claim 1 and wherein said rod is normally straight, said weighted heads being affixed to the respective outer end portions of said rod, each head being rollable and having a peripheral surface capable of rolling contact with the water's bottom whether rock laden, choked with debris or similar obstructions.

6. In combination, a sinker comprising an elongated flexible normally straight rod, duplicate weighted heads mounted on the respective opposite end portions of said rod, said heads constituting individual but conjointly cooperable sinkers, a link, said link embodying an elongated loop which is freely and slidably connected with said rod between said weighted heads, said link being provided at a leading end with an eye, a swivel operatively connected at one end to said eye, said swivel being adapted to be connected at a leading end thereof with a fishing line leader, said elongated loop being pivotally swingable on said rod in a plurality of planes including the axis of said rod.

References Cited

UNITED STATES PATENTS

| | | | |
|---|---|---|---|
| 2,502,875 | 4/1950 | Mortensen | 43—43.1 |
| 2,584,356 | 2/1952 | Larson | 43—43.14 |
| 2,787,078 | 4/1957 | Aliber | 43—43.14 |

FOREIGN PATENTS

| | | |
|---|---|---|
| 621,789 | 6/1961 | Canada. |

SAMUEL KOREM, *Primary Examiner.*

J. H. CZERWONKY, *Assistant Examiner.*